United States Patent [19]
Tiihonen et al.

[11] Patent Number: 5,974,030
[45] Date of Patent: Oct. 26, 1999

[54] SUBSCRIBER MULTIPLEXER, A TELEPHONE SYSTEM AND A METHOD FOR COMMUNICATING THE CONDITION OF A SUBCRIBER INTERFACE

[75] Inventors: Arto Tiihonen, Oulu; Vesa Tiainen, Vantaa, both of Finland

[73] Assignee: Nokia Telecommunications Oy, Espoo, Finland

[21] Appl. No.: 08/750,525

[22] PCT Filed: Jun. 14, 1995

[86] PCT No.: PCT/FI95/00346

§ 371 Date: Dec. 13, 1996

§ 102(e) Date: Dec. 13, 1996

[87] PCT Pub. No.: WO95/34966

PCT Pub. Date: Dec. 21, 1995

[30] Foreign Application Priority Data

Jun. 15, 1994 [FI] Finland ................................. 942855

[51] Int. Cl.⁶ ................................ H04J 1/16; H04J 3/14
[52] U.S. Cl. ........................ 370/241; 370/242; 370/247; 379/26
[58] Field of Search ................................ 370/241, 242, 370/244, 247, 250, 251, 535, 534, 505, 248, 249, 271, 299, 294, 356, 359, 360, 375, 376, 419, 420, 421, 422, 423; 379/22, 27, 26, 29, 39

[56] References Cited

U.S. PATENT DOCUMENTS

| | | | |
|---|---|---|---|
| 3,970,798 | 7/1976 | Epenoy et al. | 370/505 |
| 4,424,421 | 1/1984 | Townsend et al. | 370/251 |
| 4,446,341 | 5/1984 | Rubin | 379/29 |
| 5,018,184 | 5/1991 | Abrams et al. | 370/249 |
| 5,054,050 | 10/1991 | Burke et al. | 379/27 |
| 5,115,462 | 5/1992 | Kennedy et al. | 379/29 |
| 5,359,646 | 10/1994 | Johnson et al. | 379/27 |
| 5,452,339 | 9/1995 | Siu et al. | 379/29 |
| 5,471,517 | 11/1995 | Nakagawa | 379/29 |
| 5,504,753 | 4/1996 | Renger al. | 379/29 |
| 5,636,202 | 6/1997 | Garney | 370/241 |
| 5,636,260 | 6/1997 | Choppine | 379/29 |

FOREIGN PATENT DOCUMENTS

| | | |
|---|---|---|
| 577 022 | 1/1994 | European Pat. Off. . |
| 24 11 256 | 8/1975 | Germany . |
| 1 401 627 | 7/1975 | United Kingdom . |

OTHER PUBLICATIONS

Patent Abstracts of Japan, Apr. 1991 re JP 01232552.

*Primary Examiner*—Dang Ton
*Assistant Examiner*—Phirin Sam
*Attorney, Agent, or Firm*—Pillsbury Madison & Sutro LLP

[57] ABSTRACT

A subscriber multiplexer includes a receiver for receiving signals transmitted from subscriber interfaces a feeder and for feeding those signals further to a telephone exchange via a respective PCM connection, and a feeder for feeding signals transmitted from the telephone exchange via the respective PCM connection further to the subscriber interfaces. For detecting the condition of the subscriber interfaces, the subscriber multiplexer includes measuring devices for checking the condition of the subscriber interface of the subscriber multiplexer, and a controller for activating the measuring devices in response to a measurement request signal transmitted by the telephone exchange via the respective PCM connection to achieve a measurement result, and for transmitting a message describing the measurement result to the telephone exchange to a telephone system and a method for communicating the condition of a subscriber interface of a subscriber multiplexer.

5 Claims, 2 Drawing Sheets

SUBSCRIBER MULTIPLEXER, A TELEPHONE SYSTEM AND A METHOD FOR COMMUNICATING THE CONDITION OF A SUBCRIBER INTERFACE

This application is the national phase of international application PCT/FI95/00346 filed Jun. 14, 1995 which designated the U.S.

BACKGROUND OF THE INVENTION

This invention relates to a subscriber multiplexer comprising means for receiving signals transmitted from subscriber interfaces and feeding those signals further to a telephone exchange via a PCM connection, means for feeding signals transmitted from the telephone exchange via a PCM connection further to subscriber interfaces, and measuring devices for checking the condition of a subscriber interface of the subscriber multiplexer. The invention further relates to a telephone system comprising a telephone exchange, and a subscriber multiplexer connected to the telephone exchange by a PCM connection, the multiplexer comprising subscriber interfaces and measuring devices for checking the condition of subscriber interfaces by means of check measurements. The invention further relates to a method for communicating to the telephone exchange the condition of the subscriber interface of a subscriber multiplexer connected to the telephone exchange via a PCM connection.

A subscriber multiplexer is previously known, the subscriber interfaces of which are connected to subscriber stations, such as telephones and similar devices, by means of a converter means and two-wire lines. The converter means adapts, in that case, the subscriber station electrically to the subscriber multiplexer, and carries out the necessary analog-to-digital conversions. The subscriber station multiplexer is connected to the telephone exchange via a PCM (Pulse Code Modulation) connection, in which one channel of the PCM connection is allocated for each subscriber interface. The frame structure of the PCM connection between the subscriber multiplexer and the telephone exchange is typically in accordance with CCITT (The International Telegraph and Telephone Consultative Committee) recommendation G.704, the interface of the subscriber multiplexer and the telephone exchange typically being an interface in accordance with CCITT recommendation Q.512.

The weakness of the above mentioned subscriber multiplexer is the difficulty in monitoring the condition of subscriber interfaces, since monitoring the condition of a wire connected to a subscriber interface requires the visit of a maintenance person in site. The maintenance person connects a separate service terminal including measuring devices to the subscriber multiplexer, subsequent to which the maintenance person detects the condition of the subscriber interface, e.g. by means of measurements of current, voltage and/or insulating resistance. Checking the condition of the interface of a subscriber multiplexer is thus a highly inconvenient and slow measure, and also relatively costly, as it requires a visit of a maintenance person to the site of the interface.

SUMMARY OF THE INVENTION

The object of this invention is to solve the above mentioned problems and to provide a subscriber multiplexer that allows remarkably simple checking of the condition of its subscriber interfaces. This is achieved with a subscriber multiplexer of the invention, which is characterized by comprising a control means for activating measuring devices in response to a measurement request signal transmitted by a telephone exchange via a PCM connection, and for transmitting a message describing a measurement result to the telephone exchange, that message informing the telephone exchange that the measured subscriber interface is in order, or that it is faulty.

The invention further relates to a system in which the subscriber multiplexer of the invention may be utilized. The system of the invention is characterized in that the subscriber multiplexer comprises: a control means which is adapted to transmit a first message to the telephone exchange and to activate measuring devices in response to the measurement request signal transmitted by the telephone exchange, to achieve a measurement result, and adapted to transmit a second message describing the measurement result to the telephone exchange if the subscriber interface is in order, and to wait for a time-limit signal transmitted from the telephone exchange prior to transmitting the second message if the subscriber interface is out of order.

The invention further relates to a method by means of which the result of the measurement may be transmitted from the multiplexer to the telephone exchange. The method of the invention is characterized in that the measurement request signal received from the telephone exchange is acknowledged by transmitting the first message to the telephone exchange, and it is communicated that the subscriber interface is in order by transmitting the second message to the telephone exchange, or it is communicated that the subscriber interface is out of order by transmitting the second message to the telephone exchange only subsequent to receiving the time-limit signal from the telephone exchange.

The invention is based on the idea that checking the condition of subscriber interfaces is facilitated and accelerated significantly when measuring devices are integrated to the subscriber multiplexer, by means of which devices the operator may carry out check measurements of subscriber interfaces automatically from the operation and maintenance centre of the telephone network, and receive a message indicating the result of the measurement without this requiring a visit of a maintenance person to the subscriber multiplexer. The most remarkable advantages of the subscriber station multiplexer, the system and the method of the invention thus are that the condition of the subscriber interfaces may be detected at remarkably lower costs, more rapidly and in a simpler way compared with prior art solutions, without the signalling required for this remarkably complicating or loading the signalling of the telephone exchange or the subscriber multiplexer.

In a preferred embodiment of the invention, the frame structure of the PCM connection connecting the telephone exchange and the subscriber multiplexer is in accordance with CCITT recommendation G.732, and the interface between the telephone exchange and the subscriber multiplexer is a V2-type interface in accordance with CCITT recommendation Q.512, both as in effect as of Jun. 15, 1994. In this case, the signalling between the telephone exchange and the subscriber multiplexer pertaining to the measurement may be carried out in accordance with the invention completely by using a single bit, i.e. bit c of time-slot T16 corresponding to the subscriber interface to be measured in the multiframe structure, for which bit no specific use is defined in CCITT recommendation G.732. Thus, the invention may also be utilized in prior art telephone systems in accordance with the letter recommendation.

BRIEF DESCRIPTION OF THE DRAWINGS

In the following, the invention will be described in closer detail by means of a preferred embodiment of the invention, with reference to the attached figures, in which.

DETAILED DESCRIPTION

Figure 1:
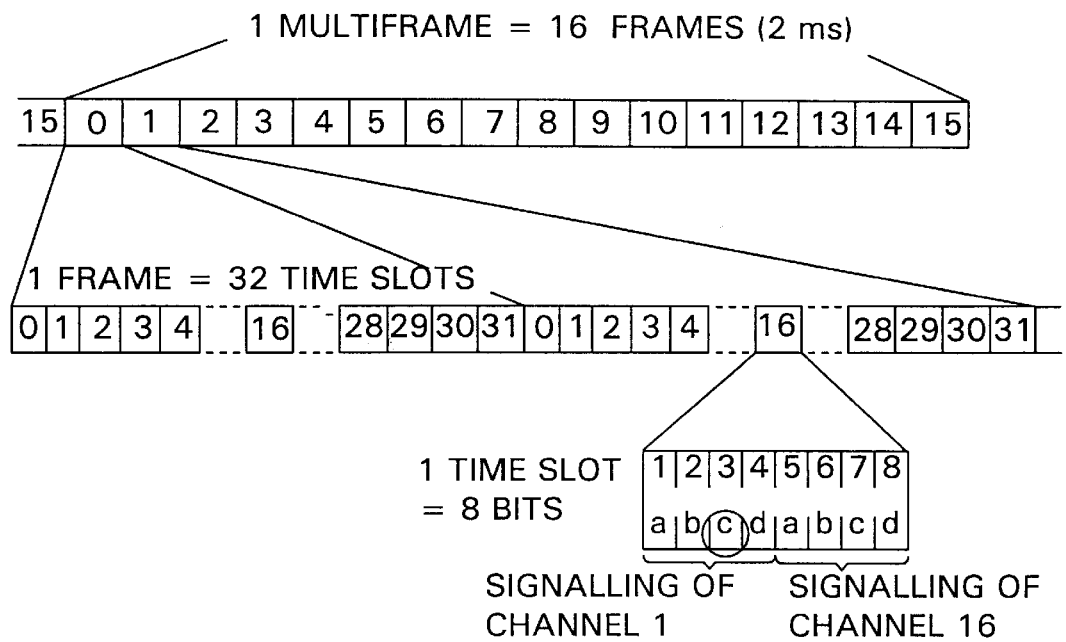
FIG. 1 illustrates a frame structure in accordance with CCITT recommendation G.732 as in effect on Jun. 15, 1994.

FIG. 1 illustrates a frame structure in accordance with CCITT recommendation G. 732 as in effect on Jun. 15, 1994. Information to be transmitted both from the telephone exchange to the subscriber multiplexer and from the subscriber multiplexer to the telephone exchange is transmitted by means of a frame structure in accordance with FIG. 1. It appears from FIG. 1 that one multiframe consists of sixteen frames, and that one frame comprises 32 time-slots. Each time-slot, in turn, comprises 8 bits. Information pertaining to channels 1 . . . 30 is set in time-slots 1 . . . 15 and 17 . . . 31. Time-slot 0 is used for transmitting the synchronizing signal of the frame and time slot 16 is used for signalling.

It further appears from FIG. 1 that in time-slot 16 of frame 2, signalling pertaining to channels 1 and 16 is transmitted by means of four bits a–d. In accordance with the recommendations, the values of these four bits are set so that b=1, c=0 and d=1 when no signalling takes place on these channels. It must be noticed that several countries, including Finland, have given recommendations of their own regarding the values of the above mentioned bits when no signalling takes place on a channel. For instance, according to the recommendations given in Finland, the values of bits b, c and d are thus b=0, c=1 and d=1. The value of bit c is thus totally opposite to what is supposed in the CCITT recommendation G.732 as in effect on Jun. 15, 1994. However, the invention will be described in the following in a case in accordance with that version of that CCITT recommendation. The invention may, however, be applied in the Finnish telephone network with a small modification, i.e. by reversing the value of bit c from one to zero, or vice versa, in the following examples.

In accordance with the invention, bit c is utilized for detecting the condition of the subscriber interfaces. In other words, if one wants to detect the condition of the subscriber interface corresponding to PCM channel 1, bit c, which is circled in FIG. 1, is used for signalling between the telephone exchange and the subscriber multiplexer.

Figure 2:
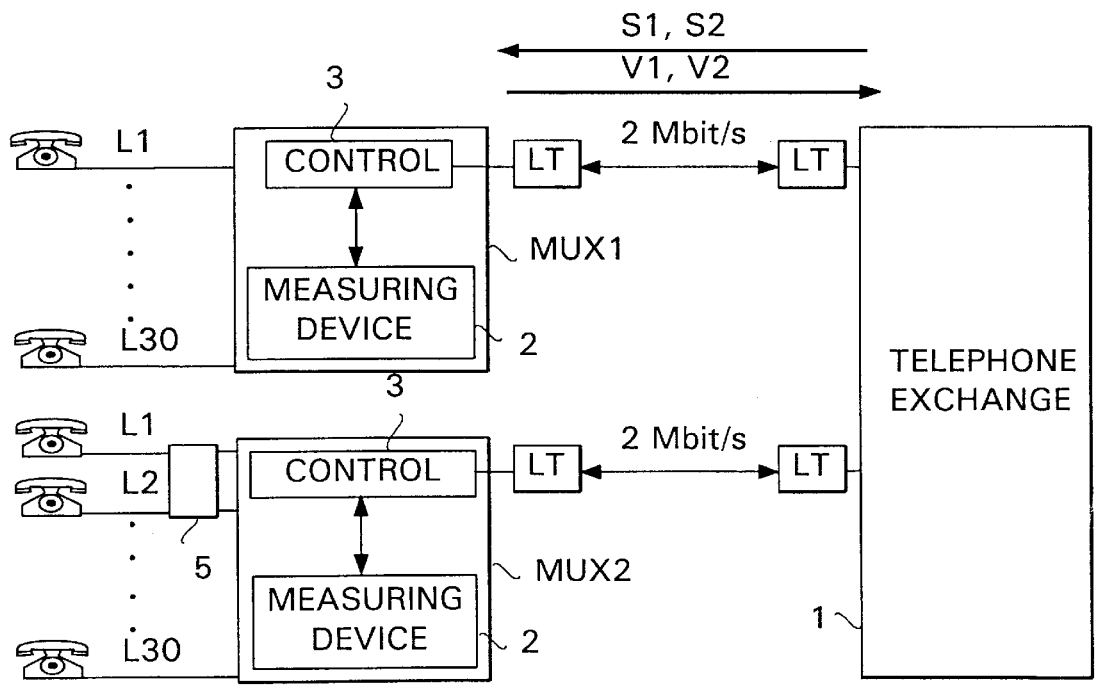
FIG. 2 shows a block diagram of the system of the invention.

FIG. 2 shows a block diagram of the system of the invention. FIG. 2 shows a telephone exchange 1 (e.g. NOKIA DX210 or DX220), to which two subscriber multiplexers MUX1 and MUX2 are connected via terminals LT (Line Terminal). The subscriber multiplexers and the telephone exchange 1 are connected via a 2 Mbit/s PCM connection, the frame structure of which is in accordance with CCITT recommendation G.732, the frame structure between the telephone exchange and the subscriber multiplexers being a digital V2 interface in accordance with CCITT recommendation Q.512, both as in effect on Jun. 15, 1994.

In FIG. 2, thirty subscriber stations (telephones and similar subscriber stations) are connected with subscriber multiplexer MUX1 by means of two-wire lines and converter means (not shown in the figure) via interfaces L1–L30. The converter means carry out necessary analog-to-digital conversions and adapt the two-wire lines electrically to the subscriber multiplexer. There is a fixed 64 kbit/s channel available for each subscriber station connected to the subscriber interface. Accordingly, telephones and additionally an analog private branch exchange 5, allocating for use two of the subscriber interfaces L1–L30 of subscriber multiplexer MUX2, are connected to subscriber multiplexer MUX2.

When the operator wants to detect, e.g. the operational condition of the subscriber interface of subscriber multiplexer MUX1, the operator initiates manually a test cycle. In this case, the telephone exchange 1 transmits a measurement request signal to subscriber multiplexer MUX1 by setting bit c of time-slot T16 corresponding to subscriber interface L1 to be measured in the multiframe structure, to the value 1. In other words, in this case bit c of time-slot T16 of frame 1 shown in FIG. 1 is used. Bit c is circled in FIG. 1 (the value of bit c is normally 0 according to the above-identified CCITT recommendations). A control unit 3 of subscriber multiplexer MUX1 detects that the value of that bit has changed, as a result of which it activates a measuring device 2 and transmits a first message V1 to the telephone exchange also by setting in the frames to be sent towards the telephone exchange bit c of time-slot T16 corresponding to subscriber interface L1 to be measured in the multiframe structure to the value 1.

Subsequent to this, the measuring device 2 measures the condition of subscriber interface L1 in a way known per se, e.g. by carrying out measurements of current, voltage and/or insulation resistance for the two-wire line, and by testing the condition of the converter means by means of a separate test program. The control unit 3 monitors the progress of the measurements. When the measurements are completed, the control unit 3 transmits the second message to the telephone exchange by setting bit c of time-slot T16 corresponding to subscriber interface L1 of the multiframe structure to the value 0 if subscriber interface L1 is in order according to the measurements. If, however, the measurements indicate that the respective subscriber interface is faulty, the control unit will wait until the telephone exchange transmits a time-limit signal S2, before it transmits the second message V2 to the telephone exchange 1.

Subsequent to transmitting a measurement request signal S1, the telephone exchange 1 monitors the value of the bit c in the frames received from the subscriber multiplexer. When the telephone exchange 1 detects that the value of that bit has changed to one (the first message V1), it starts a timer. When the timer indicates that a certain predetermined time has expired, the telephone exchange detects that the test has failed, i.e. that the subscriber interface in question is faulty (unless it has received a second message V2 by that time), and it transmits a time-limit signal S2 to the subscriber multiplexer, by setting the bit c to the value 0.

Figure 3:
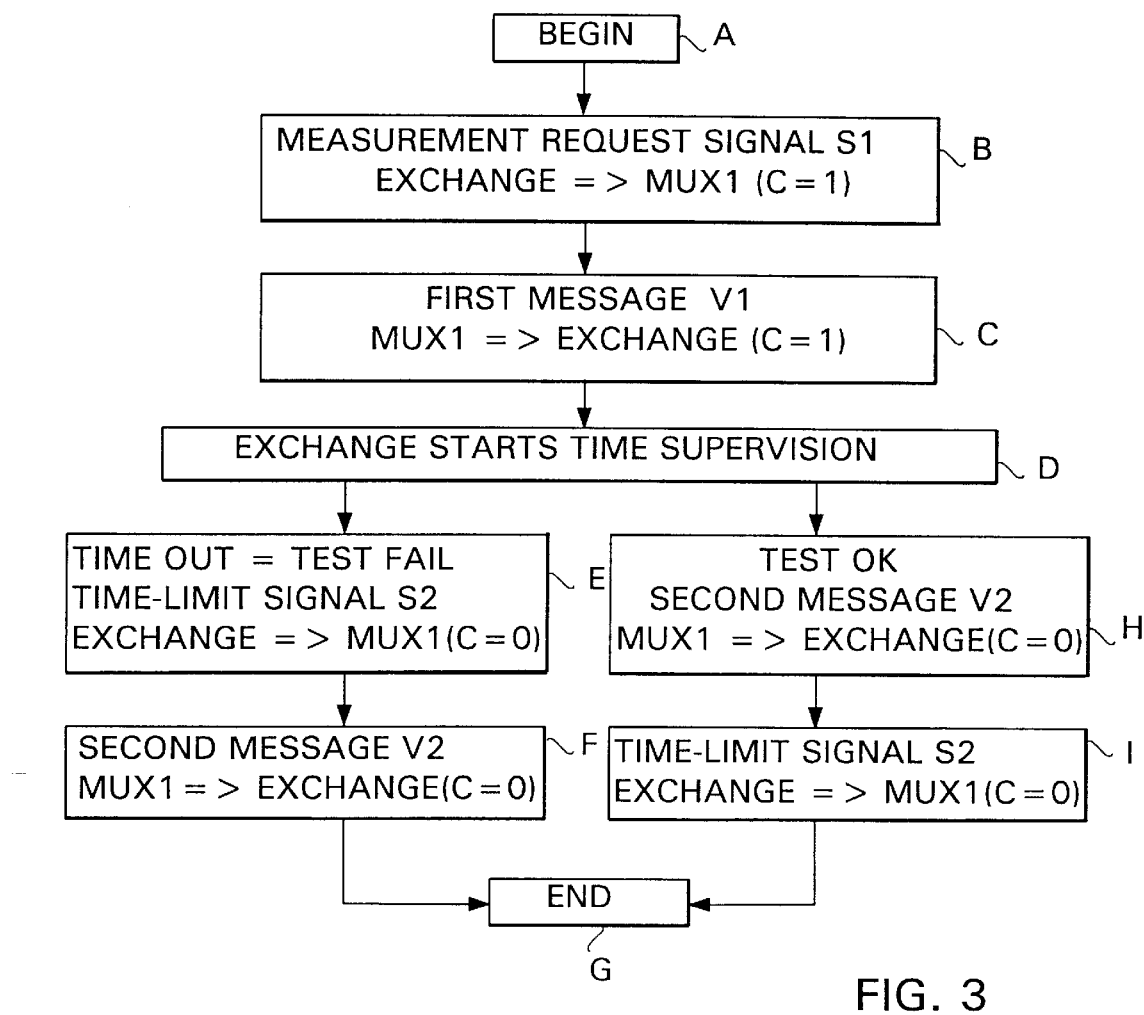
FIG. 3 shows a flow diagram of the progress of the test in accordance with the invention.

FIG. 3 shows a flow diagram of the progress of the test in a system of the invention. When the operator has started the test in block A, the telephone exchange transmits a measurement request signal S1 in block B (i.e. bit c is set to the value 1) to the subscriber multiplexer. The subscriber multiplexer acknowledges the start of the test in block C by transmitting a first message V1 to the telephone exchange (i.e. bit c is set to the value 1). This means that the measuring device of the subscriber multiplexer starts testing the subscriber interface. When the exchange receives the first message, it initiates time supervision in block D. The telephone exchange has received in advance the information on how long the test is expected to last. If the time in question expires, the exchange states that the test has failed due to a faulty subscriber interface and transmits the time-limit signal S2 (i.e. bit c is set to the value 0) to the subscriber multiplexer in block E. The subscriber multiplexer acknowledges the time-limit signal with a second message V2 (i.e. bit c is set to the value 0) in block F, subsequent to which the test is ended in block G.

If, however, the measured subscriber interface of the subscriber multiplexer is in order, the subscriber multiplexer transmits the second message V2 (i.e. bit c is set to the value 0) to the telephone exchange in block H. The telephone exchange acknowledges the second message in block I by transmitting the timelimit signal S2 (i.e. bit c is set to the value 0) to the subscriber multiplexer, subsequent to which the test is ended in block G.

Thus, the information on the condition of the subscriber interface of the subscriber multiplexer may be transmitted to the exchange by allocating a single bit per channel, i.e. bit c of time-slot T16. The information received at the exchange only indicates whether the subscriber interface is in order or not, after which more accurate information is obtained only when a maintenance person has tested the subscriber multiplexer in site.

It should be understood that the above description and the figures associated therewith are only intended to illustrate the present invention. Different variations and modifications will be obvious for persons skilled in the art, without deviating from the scope and the spirit of the invention set forth in the attached claims.

We claim:

1. A telephone system, comprising:
   a telephone exchange having an exchange portion of a PCM connection;
   a subscriber multiplexer for serving between said telephone exchange and a plurality of subscribers, comprising:
      a subscriber multiplexer portion of the PCM connection, constituting with said exchange portion respective PCM connection;
      receiving means for receiving signals transmitted by respective ones of subscriber interfaces, and for feeding those signals via said PCM connection to said telephone exchange;
      feeding means for feeding signals transmitted by said telephone exchange and received via said PCM connection, to respective ones of said subscriber interfaces;
      an at least one measurement device, said at least one measurement device being arranged for checking a respective condition of any requester one of said subscriber interfaces, and providing a respective measurement result;
      a control means arranged for activating said at least one measuring device, in response to receiving a measurement request signal transmitted by said telephone exchange via said PCM connection, for checking the condition of a respective one of said subscriber interfaces to obtain the respective measurement result, and for transmitting a respective message to said telephone exchange via said PCM connection, based on said respective measurement result, that the respective one of said subscriber interfaces is in order, or provides a respective connection which is faulty;
   said telephone exchange being arranged to provide, and said control means being arranged to wait to receive a time-limit signal before transmitting said respective message, if said respective measurement result indicates that the respective one of said subscriber interfaces provides a respective connection which is faulty wherein said telephone exchange is arranged to provide said time-limit signal when a predetermined time has passed since said telephone exchange has sent said measurement request signal without thereafter having received said respective message, based on said respective measurement result, that the respective one of said subscriber interfaces is in order.

2. The system of claim 1, wherein:
   said subscriber multiplexer and said telephone exchange are arranged to communicate on said PCM connection using a multiframe structure which is in accordance with CCITT recommendation G.732, over an interface which is in accordance with a CCITT recommendation Q.512 for a V2 interface; and
   said control means is arranged to receive said measurement request signal and said time limit signal in a particular time slot of said multiframe structure, and to transmit said respective message based on said respective measurement result, in said particular time slot.

3. A method for communicating to a telephone exchange whether any respective connection of a plurality of connections of respective subscriber stations provided through respective subscriber interfaces of a subscriber multiplexer which is in turn connected by a PCM connection to the telephone interchange is in order or is faulty, comprising the steps of:
   the telephone exchange sending a measurement request signal to the subscriber multiplexer via said PCM connection, thereby causing a controller of the subscriber multiplexer to initiate operation of an at least one measuring device for obtaining a measurement result indicative of a condition of a respective connection provided via a respective one of said subscriber interfaces and providing that measurement result to said telephone interchange; only if said measurement is indicative of the respective connection being in order, said controller sending a first type of message to said telephone exchange via said PCM connection;
   said telephone exchange waiting for a predetermined time following sending said measurement request signal to receive a respective first type of message, and, if no such first type of message is received upon expiration of said predetermined time, said telephone exchange sending a time-limit signal to said controller via said PCM connection, for thereby causing said controller to send to said telephone exchange via said PCM connection a second type of message indicative of the respective connection being faulty.

4. The method of claim 3, wherein:
   said telephone exchange and said subscriber multiplexer, when respectively sending said signals and said messages, communicating on said PCM connection using a multiframe structure which is in accordance with CCITT recommendation G.732, over an interface which is in accordance with a CCITT recommendation Q.512 for a V2 interface, and to receive the respective of said measurement request signal and said time-limit signal in a particular time slot of said multiframe structure, and to transmit a respective message based on said measurement result, in said particular time slot.

5. The method of claim 4, wherein:
   sending each of said signals and messages involves changing only one data bit in a respective time slot of a respective frame.

* * * * *